June 5, 1962  J. S. GREGORIUS  3,037,323
TILTABLE GLASS FORMING DAY TANK
Filed Dec. 20, 1956  9 Sheets-Sheet 5
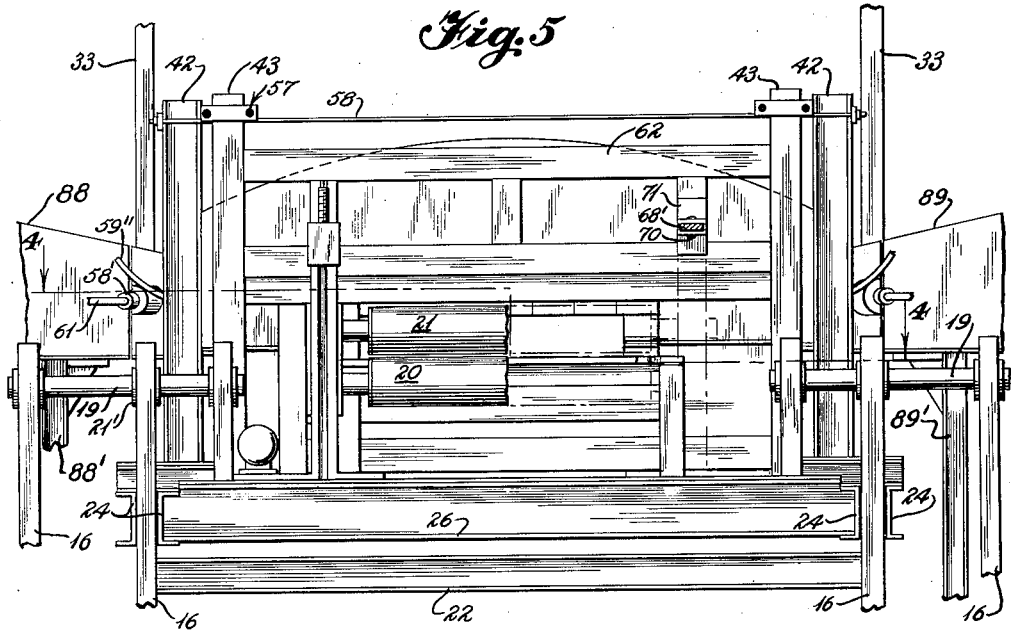
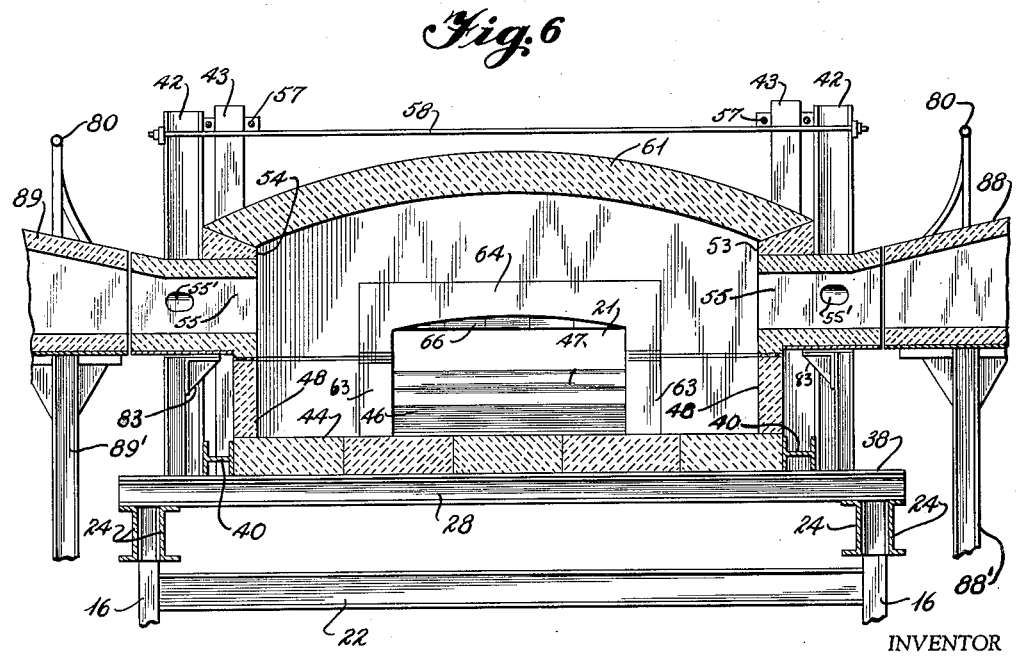
INVENTOR
Joseph S. Gregorius
BY  Oscar L. Spencer
ATTORNEY

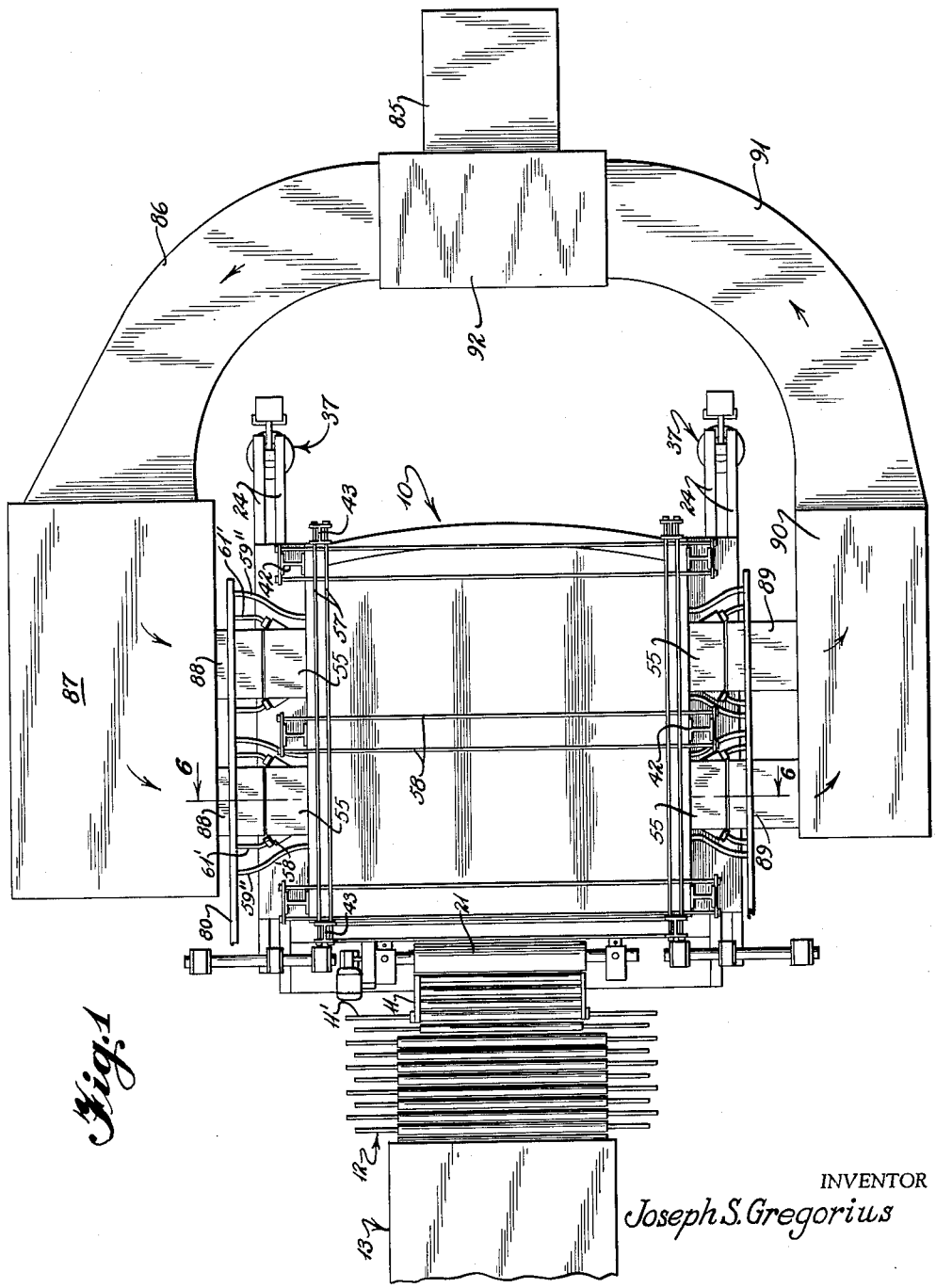

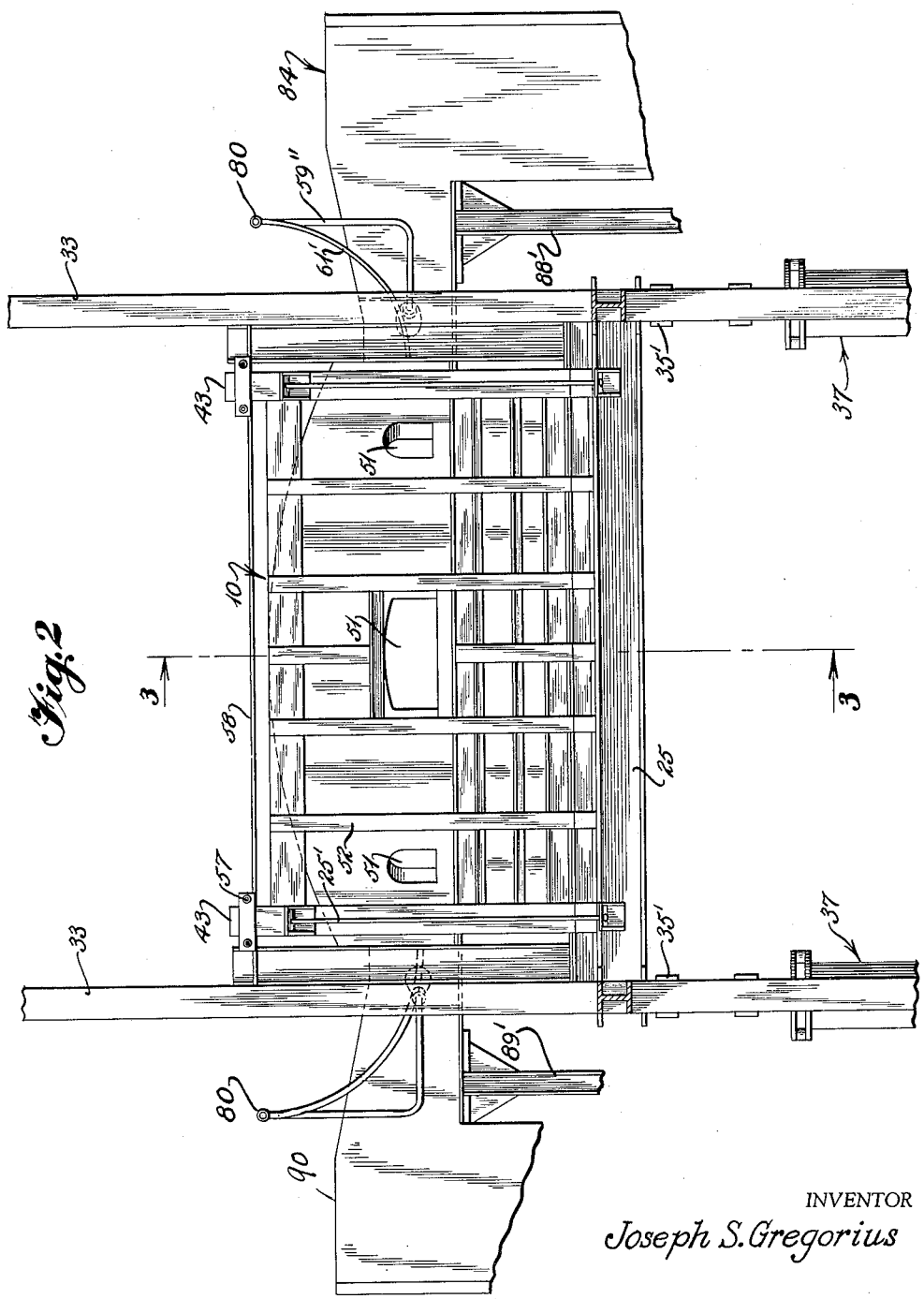

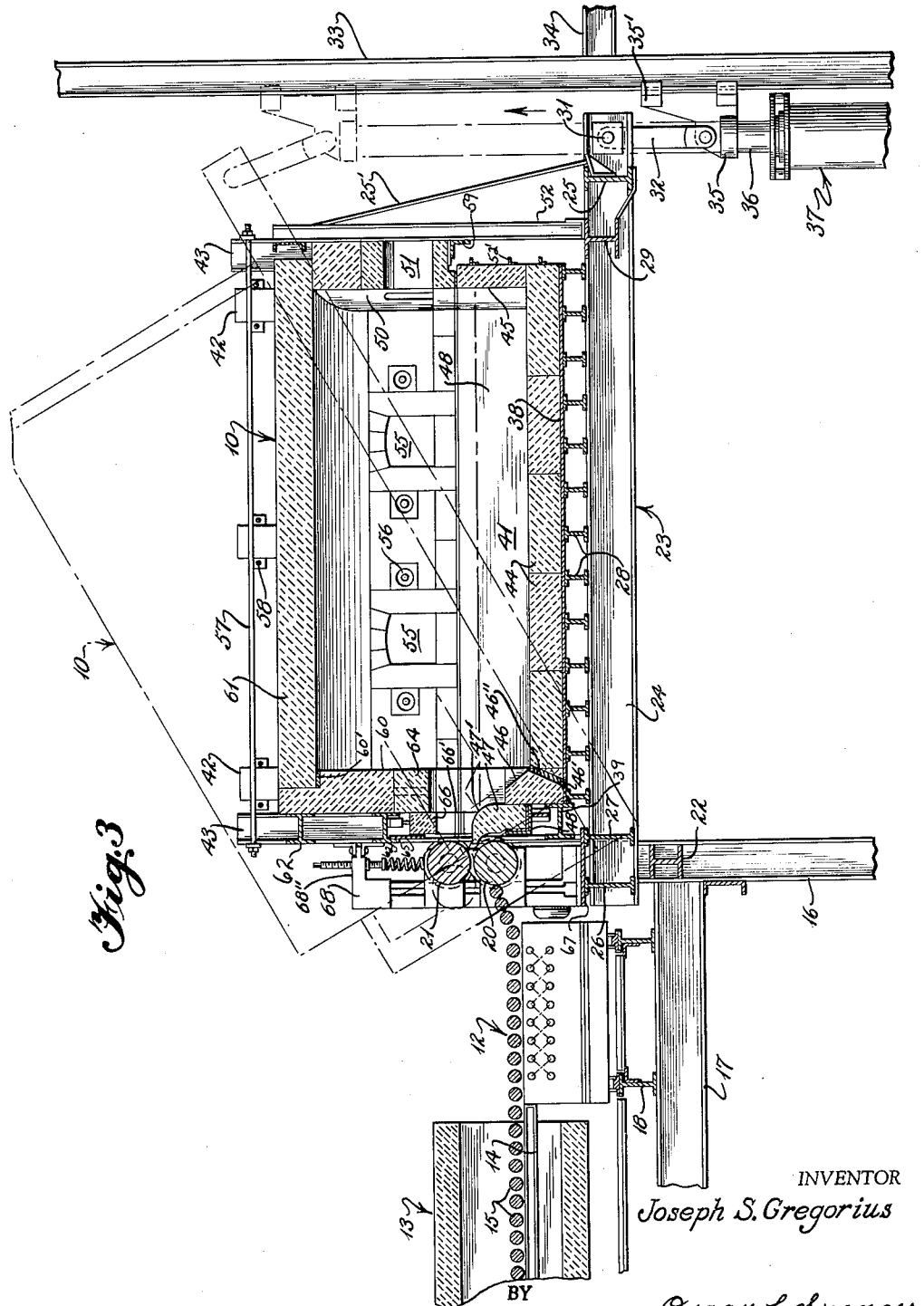

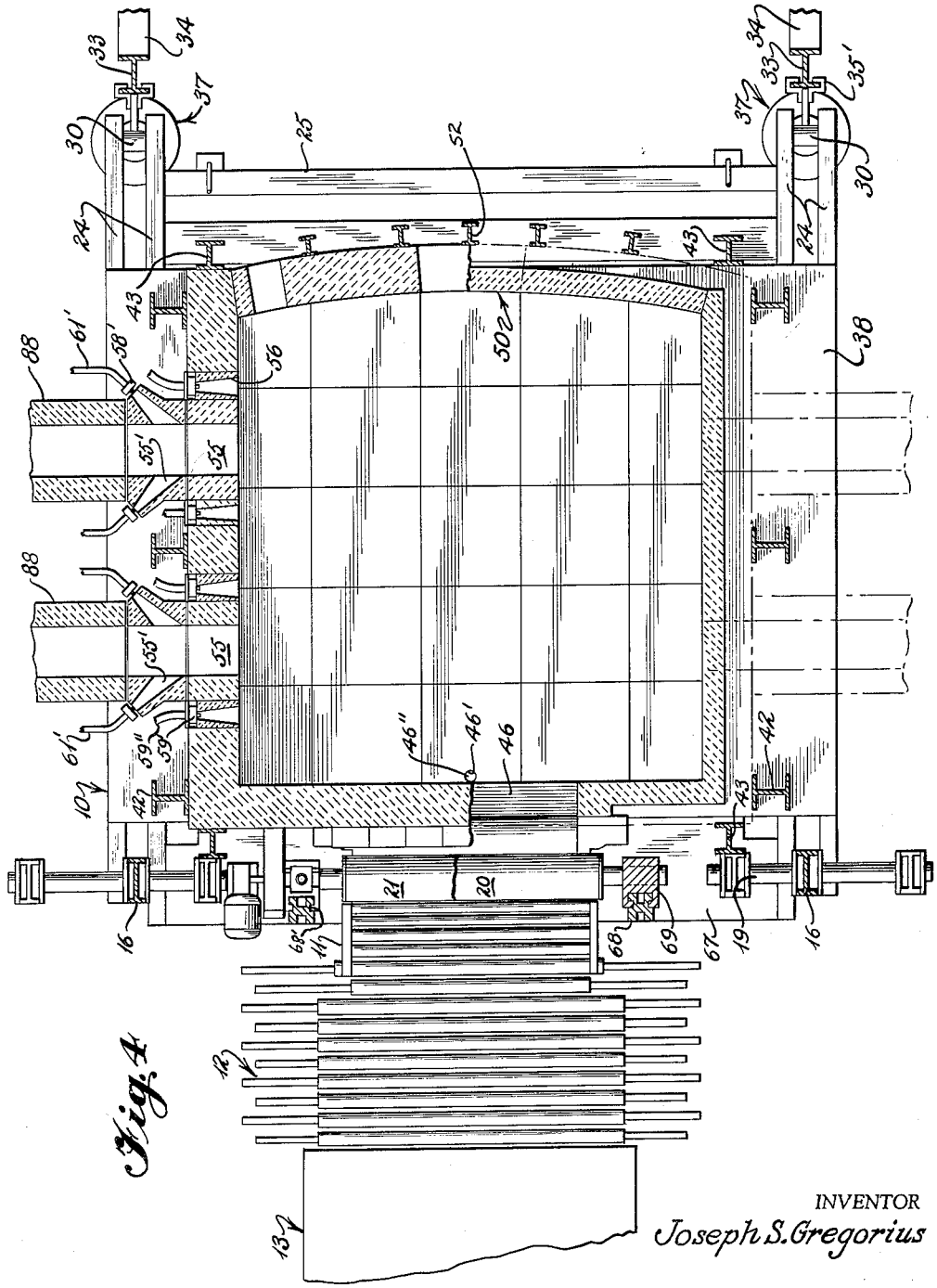

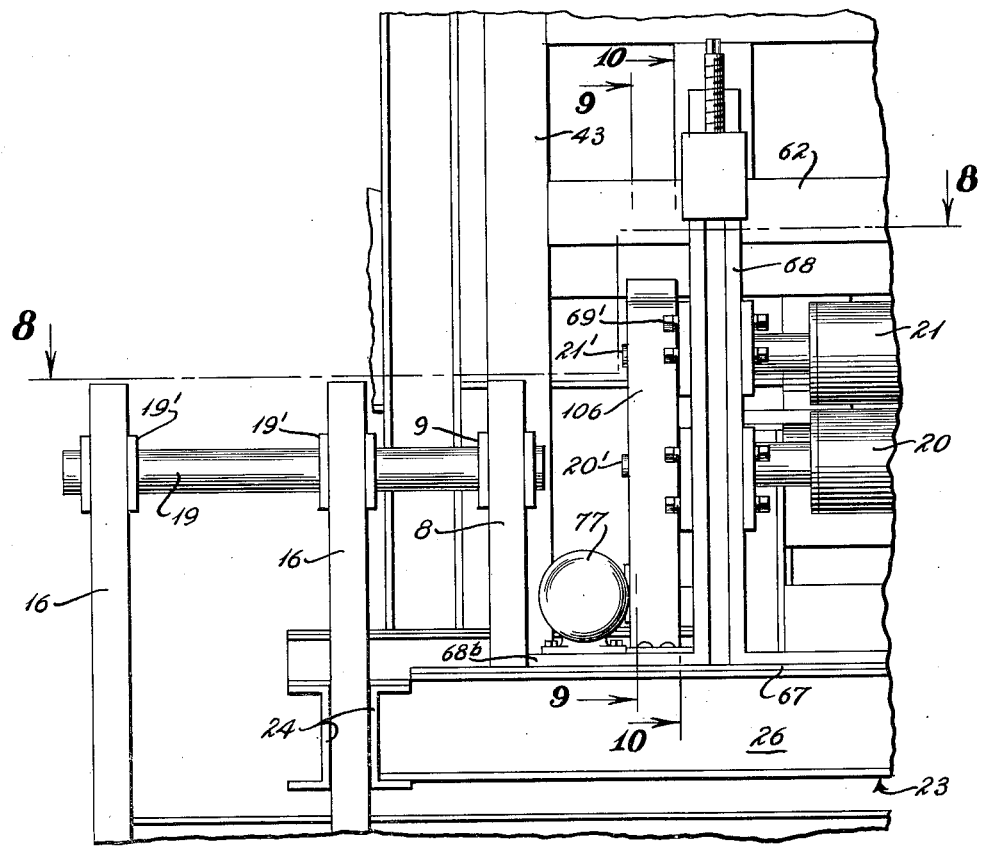
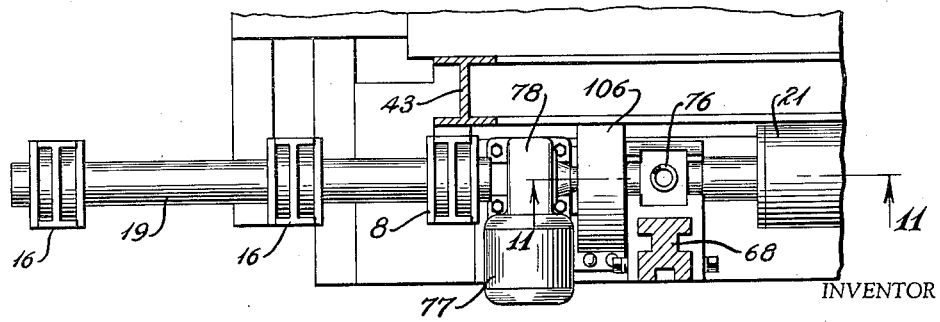

June 5, 1962 J. S. GREGORIUS 3,037,323
TILTABLE GLASS FORMING DAY TANK
Filed Dec. 20, 1956 9 Sheets-Sheet 7

INVENTOR
Joseph S. Gregorius
BY Oscar L. Spencer
ATTORNEY

June 5, 1962

J. S. GREGORIUS 3,037,323

TILTABLE GLASS FORMING DAY TANK

Filed Dec. 20, 1956

INVENTOR
Joseph S. Gregorius

BY Oscar L. Spencer
ATTORNEY

June 5, 1962  J. S. GREGORIUS  3,037,323
TILTABLE GLASS FORMING DAY TANK
Filed Dec. 20, 1956  9 Sheets-Sheet 9

INVENTOR
Joseph S. Gregorius
BY Oscar L. Spencer
ATTORNEY

United States Patent Office 3,037,323
Patented June 5, 1962

3,037,323
TILTABLE GLASS FORMING DAY TANK
Joseph S. Gregorius, Tarentum, Pa., assignor to Pittsburgh Plate Glass Company, Allegheny County, Pa., a corporation of Pennsylvania
Filed Dec. 20, 1956, Ser. No. 629,649
3 Claims. (Cl. 49—3)

My invention is directed to glass making apparatus and particularly to a tiltable day tank.

It is an object of my invention to provide a tiltable day tank of the order of about 30 tons capacity.

Another object of my invention is to provide a tiltable day tank which will afford moderately low volume production of one item or production of small lots of varied glass composition yet lower the cost as compared with small lot pot casting and obtain nearly the same flexibility as with pot casting.

A further object of my invention is to provide a tiltable day tank in combination with a regenerator firing system which will permit production of a single item or small lots of varied composition with a saving in cost over pot casting but with the flexibility of pot casting.

Another object of my invention is to provide a tiltable day tank which may be tilted for working and which has auxiliary burners to afford firing during tilting for teeming and for pouring.

A still further object of my invention is to provide a tiltable day tank with feed rolls wherein the axis of the lower feed roll is the tilting axis of the tank.

A still further object of my invention is to provide a tiltable day tank with an associate regenerator firing system which permits tilting of the tank past the regenerator inlet and outlet ducts in closely spaced relationship to the firing and exhaust ports of the day tank.

Still further objects and the entire scope of applicability of the present invention will become apparent from the detailed description given hereinafter. It should be understood, however, that the detailed description and specific examples are given by way of illustration only and, while indicating preferred embodiments of the invention, are not given by way of limitation, since various changes and modification within the spirit and scope of the invention will become apparent to those skilled in the art from this detailed description.

This tiltable day tank of my invention is about 30 tons capacity. It permits product and glass composition change as contrasted with a conventional tank which would require a 14 to 20-day shutdown to drain and refill if a product change was desired. This tiltable day tank has regenerative firing and abutting breaks are provided in the regenerative duct work to permit tilting of the tank. Firing of the tank during tilting is accomplished by auxiliary burners with flexible fuel conduits connected to the fuel supply header.

My tiltable day tank of the order of 30 tons permits about a 48-hour cycle and thus single items or small lots of varied composition may be produced.

This tiltable day tank approaches the flexibility of pot casting yet there is a saving over pot casting. In pouring from my 30-ton tiltable day tank there is a loss of the head and tail of 15,000 square feet of glass poured. However, in pot casting, to reach the 30-ton capacity of my tiltable day tank, 25 or 26 pots would be required. In pouring each pot there is a loss of the head and tail of each 600 square feet of glass poured. Thus, with 25 or 26 pots used to equal the capacity of my 30-ton tiltable day tank there would be a head and tail loss on each pot poured as compared with a single head and tail of my 30-ton tiltable day tank.

For a more complete understanding of the nature and scope of my invention, reference may be had to the drawings in which:

FIG. 1 is a top plan view of the day tank and its accessories;

FIG. 2 is a rear elevational view of the apparatus with a portion of the recirculating and air duct work removed;

FIG. 3 is a vertical cross section of the day tank on line 3—3 of FIG. 2 with broken line position showing tilted position for the day tank;

FIG. 4 is a cross sectional plan view along section lines 4—4 of FIG. 5;

FIG. 5 is a vertical elevational view at the front and feed roller end of the day tank with a portion of the right-hand end of the feed rollers broken away;

FIG. 6 is a vertical cross sectional view through the tank along lines 6—6 of FIG. 1;

FIG. 7 is an enlarged fragmentary view of the left-hand end of the rollers and pivotal mounting for day tank as viewed in FIG. 5;

FIG. 8 is a sectional view along line 8—8 of FIG. 7 showing the motor drive for the rolls;

Throughout the description and the various figures of the drawing like reference numerals and characters refer to similar parts.

Figure 9:
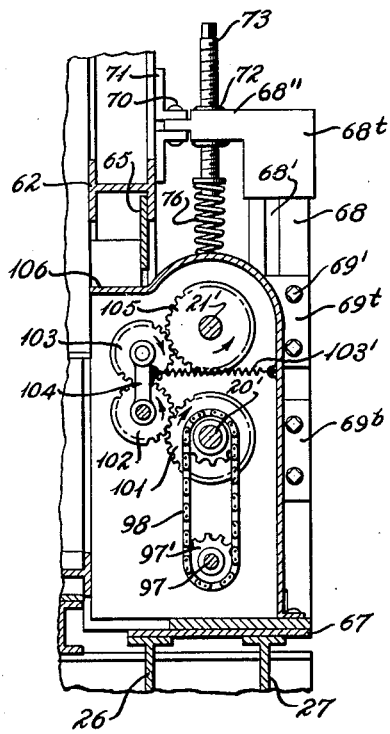
FIG. 9 is a vertical cross sectional view along line 9—9 of FIG. 7 showing the drive for the rolls.

The day tank or glas melting tank is generally indicated at 10 and has certain accessories such as apron rollers 11 pivoting about a pivot axis 11' on an apron 12 of rollers which is in alignment to transfer poured glass into the leer generally indicated at 13 and having a platform 14 therein supporting rollers 15.

Two vertical fixed I-beamed supports 16 at each side of the day tank form the main support from which horizontal beams 17 extend forwardly, see FIG. 3, to form a support for the cross beams 18 supporting platform 12. This day tank is of the order of 30 tons capacity and is tiltable about the axis through the lower roll 20, see FIG. 5, which axis contains each end pivot shaft 19 as well as end shaft 20' of roll 20. Suitable bearings 19' are mounted in the upper ends of the spaced apart vertical beams 16 at each side of the day tank and support the ends of each pivot shaft 19. Shaft 19 serves as a swing pivot for the day tank platform generally indicated at 23. Upper roller 21 moves with the tank as indicated in FIG. 3 as will hereinafter be described in connection with the tank construction.

A platform generally indicated at 23 made up of beams welded together forms the base support for the tiltable day tank. Longitudinal pairs of channel beams 24 are spaced apart so as to have sliding and guiding engagement on the outer vertical supports 16 as shown in FIGURES 5 and 6. These beams 24 are tied together by cross I-beams 28, see FIG. 3. The rear end of the inner beams 24 are tied together by the cross beam 25. The forward ends of the inner beams 24 are tied together by the spaced apart cross beams 26 and 27. An additional cross channel I-beam forming a base support for vertical posts 52 is indicated at 29. Beam 29 extends intermediate the inner longitudinal beams 24—24. The platform is swung from pivot shafts 19 at each side by vertically extending posts 8 secured to the plates 67 and cross I-beams 26 and 27. The tops of the posts 8 have bearings 9 which receive the shafts 19.

Each of the pairs of longitudinal beams 24—24 are also tied together at their rear end by a spacer 30 through which passes the pivot pin 31 and to which is attached a lift link 32. A pair of rear vertical beams 33 of I-beam type are fixed by suitable supports 34 and serve as a track for the shoe 35 having a runner portion 35′ which fits over the flange of the I-beams 33. Shoe 35 is attached to the outer end of piston rod 36 of the hydraulic lift cylinder generally indicated at 37 which is mounted adjacent each of the vertical beams 33 and serves to lift and lower the tiltable day tank 10.

Supported on the bed beams 28 is a floor plate of steel 38 and along its front end is the cross support base channel I-beam 39 and two side beams 40 which are welded at their butting ends to the front cross beams 39 to form a rigid U-shaped in plan support for the base refractory of the glass bath of the furnace. These side beams 40 are best shown in FIG. 6 and they are welded to the adjacent sides of the vertically extending spaced apart posts 42 at each side of the day tank. The posts 42 are also welded at their bottom ends to the floor plate 38 and are thus tied into the side beams 24 as well as the side beams 40. End posts 43, one on each corner, are best shown in FIG. 4 and these are welded at their bottoms to the floor plate 38 and tied into the base generally indicated at 23. Laid up on this base 23 and on the floor plates 38 are the refractory blocks making up the floor as indicated at 44, the curved rear end 45 of the tank, the front end combination base and end blocks 46, having the drain aperture 46′ for plug 46″ formed therein, abut the lipstone 47 which extends vertically towards the top of the glass tank and has a convex inner surface as at 47′ which forms a pouring surface. This lipstone 47 is supported by an L-shaped in cross section fabricated channel beam 48, see FIG. 3, which extends across the front of the furnace and is welded to the vertical end posts 43. The combustion chamber proper is above the glass bath 41 and has thicker refractory walls as best shown in FIG. 6. The basin side walls of the glass bath 41 are indicated at 48 and they have a thickness about half the thickness of the side walls of the furnace chamber per se above the glass bath. The rear end of the furnace is curved and is built up of refractory shapes generally indicated at 50 with loading apertures 51 therein. These curved refractory blocks at the rear end are supported by vertically extending posts 52 welded at their bottom ends to the cross I-beam 29. The upper side walls of refractory block are indicated at 53 and 54, see FIG. 6, and have firing ports or regenerator openings on one side and exit and regenerator ports or openings on the opposite side as generally indicated at 55 and auxiliary burner openings 56 formed therein. These walls are tied together by the vertical posts which have front and back extending tie rods 57 connecting the front and back posts 43 while the cross tie rods 58 secure the side posts 42. The openings 55 shown in special refractory shapes in FIG. 6 have burner openings 55′ therein. These burner openings extend diagonally inward from opposite sides and have burners 58′ positioned thereadjacent. Angle iron pieces 52′, FIG. 3, extend horizontally at the rear of the tank outside of wall 45 and are supported by the end posts 43—43 thereadjacent. An angle iron 59 also welded at its ends to the corner posts 43—43 supports the overhanging upper rear wall 50. Tension brace rods 25′ extend from the cross beam 25 to the tops of the rear vertical end posts 43.

The refractory roof 61 abuts on ledge 60′ of front wall 60. Supports at the outside of front wall 60 are in the form of two spaced apart horizontally extending I-beams 62 which are secured at their ends to the adjacent front vertical end posts 43—43. In the wall 60 is formed, see FIGURES 3 and 6, vertically extending refractory shapes 63 adjacent the ends of lipstone 47 and across the top refractory shapes 64 are positioned at the pouring aperture adjacent the rolls 20 and 21. Reference to FIG. 3 shows a vertical plate 65 depending from lower cross beam 62, and between plate 65 and refractory cap 64 there is supported from beam 62 an arched refractory member whose end portions at either end rest on tuck plates 66′ as shown in FIG. 3 by the double lines. Disposed across the tops of the front cross beams 26 and 27, see FIG. 3, is a plate 67. Supported on plate 67 are two spaced apart vertical columns 68 of the cross sectional configuration as shown in FIG. 4 which have oppositely disposed slideways 68′ that receive slide members 69b and 69t that are secured thereto after assembly therein as by bolts 69′.

Figure 10:
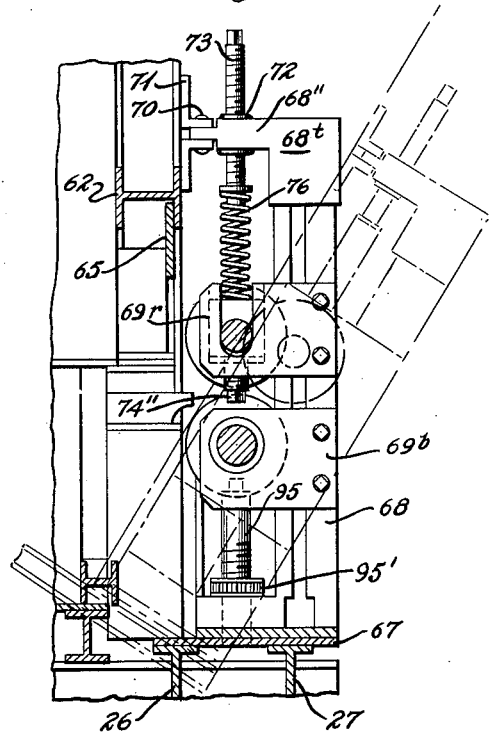
FIG. 10 is a vertical sectional view along line 10—10 of FIG. 7 showing the rolls and the tilted position of the rolls in broken line.

The tops of the columns slidingly receive cap pieces 68t which extend transversely toward the tank at 68″, see FIGS. 3, 9 and 10. The top parts 68″ are attached by rivet pins 70 to angle fittings 71 secured on the front structure of the tank. In the transversely extending parts 68″ are vertically extending threaded bushings 72, see FIG. 11, which receive screw rods 73. Bottom slide member 69b, see FIG. 10, has an aperture therethrough in which is mounted a sleeve bearing 94 that receives the end shaft 20′ of lower roller 20. In positioning the slide member 69b use is made of a threaded stud 95 disposed between the base of column 68 and the slide 69b. After the stud 95 is rotated to position, slide 69b, stud 95 is locked by the locking nut 95′ while slide 69b is secured in position on column 68 by lock screws 69′.

The upper slide member 69t has bifurcated sides and a vertically extending recess 69r extending down from the top to receive a slide bearing 74 that supports the end shaft 21′ of the top roll 21. Slide bearing 74 has a recess 74′ in the top thereof which receives the lower end of compression spring 76. The lower end of screw rod 73 is formed with a flange 73′ spaced in from the lower end which projects into the top end of compression spring 76. Downward positioning of the slide 74 is accomplished by a plug screw 74″ threadedly received in a threaded aperture in the bottom of slide member 69t. Thus, roll 21 is mounted for yielding movement upward such as would be necessary if a piece of cullet should come between the rolls thereby minimizing the amount of damage that the cullet might do the rolls.

Figure 11:
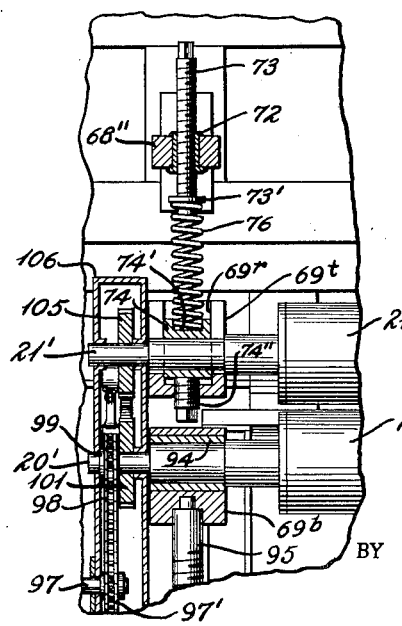
FIG. 11 is a vertical sectional view along line 11—11 of FIG. 8 showing the mounting of the rolls and their driving mechanism.

Drive for the rolls 20 and 21 is provided by a motor 77 and gear box 78 mounted on base plate 68b of adjacent column 68 and tiltable with the day tank. Power shaft 97 extending from gear box 78 as shown in FIG. 11 has a sprocket 97′ thereon that is connected by chain 98 to a sprocket 99 on shaft 20′ of the lower roll 20. Roll 21 is driven through a flexible drive from a gear 101 on shaft 20′ so that roll 21 may move up and down, see FIG. 9. A pair of intermeshing gears 102 and 103 yieldable mounted by spring 103′ for in and out movement are mounted on a yoke 104 with gear 103 meshing with and driving gear 105 on shaft 21′. A housing 106 encloses the drive.

The opening or ports 55 and their associated burner openings 55′ which are at each side of the day tank upper portion are indicated in FIG. 6. Each of the ports 55 are built into the day tank and are supported on horizontal supporting members 83 secured to the vertically extending side members 42.

Reference to FIGURES 1 and 2 shows the regenerator firing system generally indicated at 84 and in the particular setting shown, housings 87 and 90 are set up as chambers containing brick checker work therein. Air is supplied under pressure from the intake 85 about the chimney housing 92. Conduit 86 connects chimney housing 92 with housing 87 that has ducts or conduits 88 which act in the arrangement shown as inlet ducts for firing and regeneration ports 55. The burnt gases pass out of the exit and regenerator ports 55 on the opposite side of the tank and through ducts 89, housing 90, conduit 91 to chimney housing 92. Suitable dampers and baffling are included in the chimney housing 92 whereby the circulation may be reversed and burners used in the opposite side ports 55 along with similar auxiliary burners 56 to reverse the circulation whereupon heated housing 91 would act as an air preheater. Conduits 88 and 89 are respectively supported by support work 88' and 89'.

During the normal firing with the day tank in an untilted position, fuel from header 80 is led to burners 58' through conduits 61'. When the tank is tilted the auxiliary burners 59' are used and these are fed by sufficiently long flexible conduits 59" which are also connected to the fuel header 62. A similar fuel feeding arrangement is provided for use at the opposite side of the tank.

*Modified Tiltable Day Tank Mounting*

Figure 12:
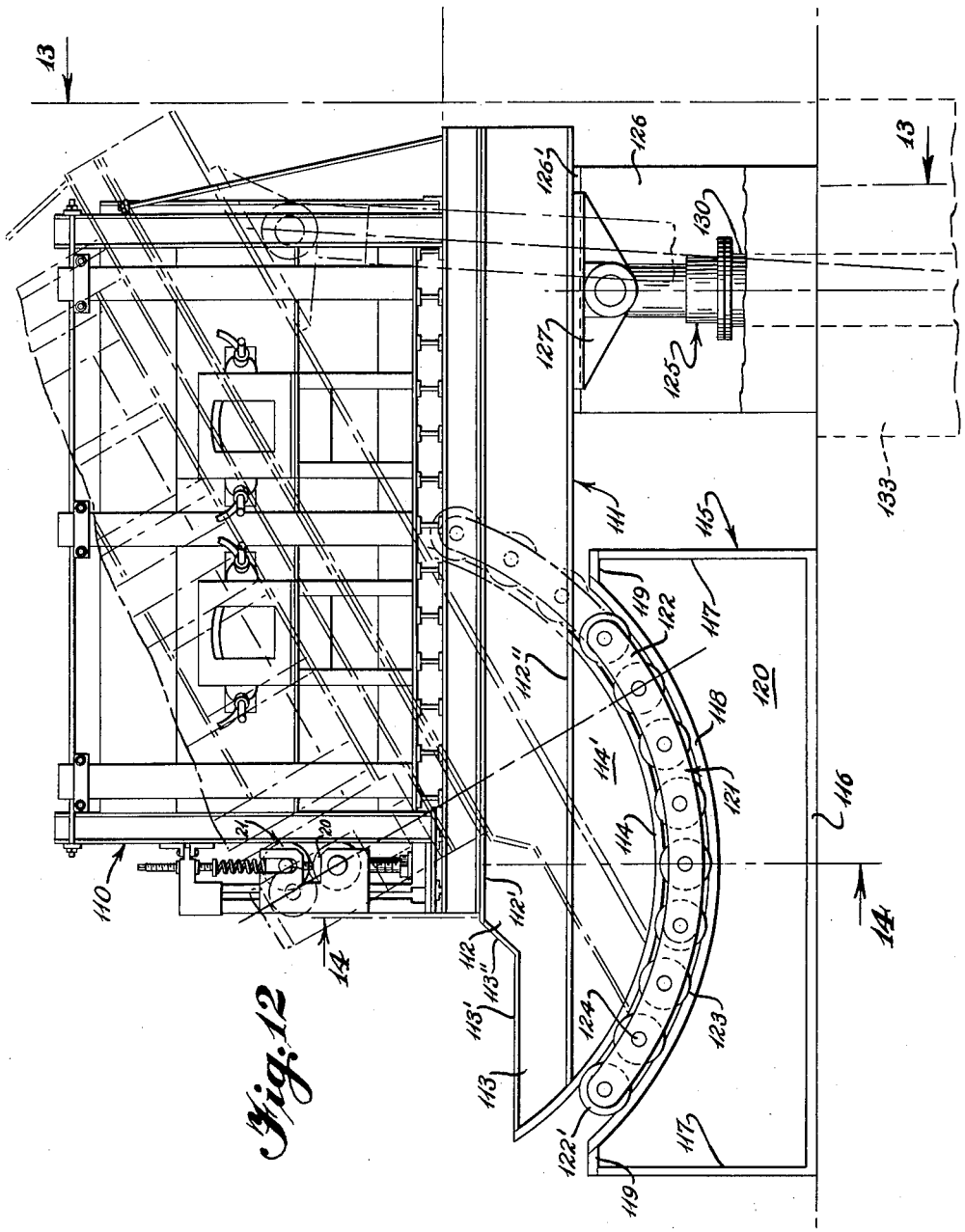
FIG. 12 is a side elevation view of a modified tiltable day tank having a different tilt mounting.
Figure 13:
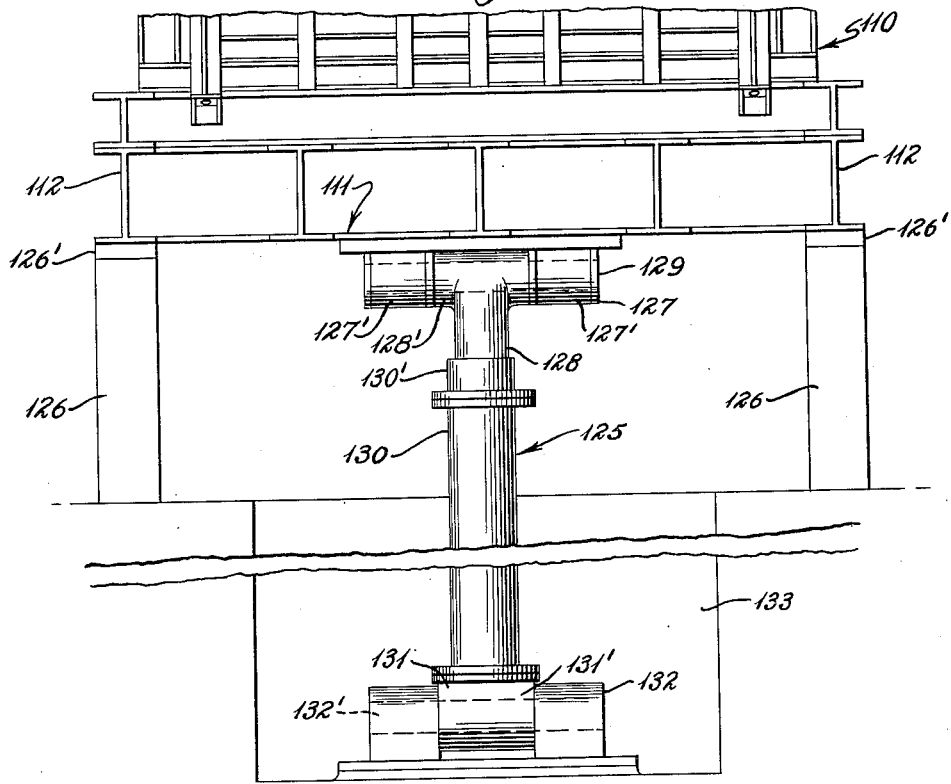
FIG. 13 is a rear elevational view of the tiltable day tank along line 13—13 in FIG. 12.
Figure 14:
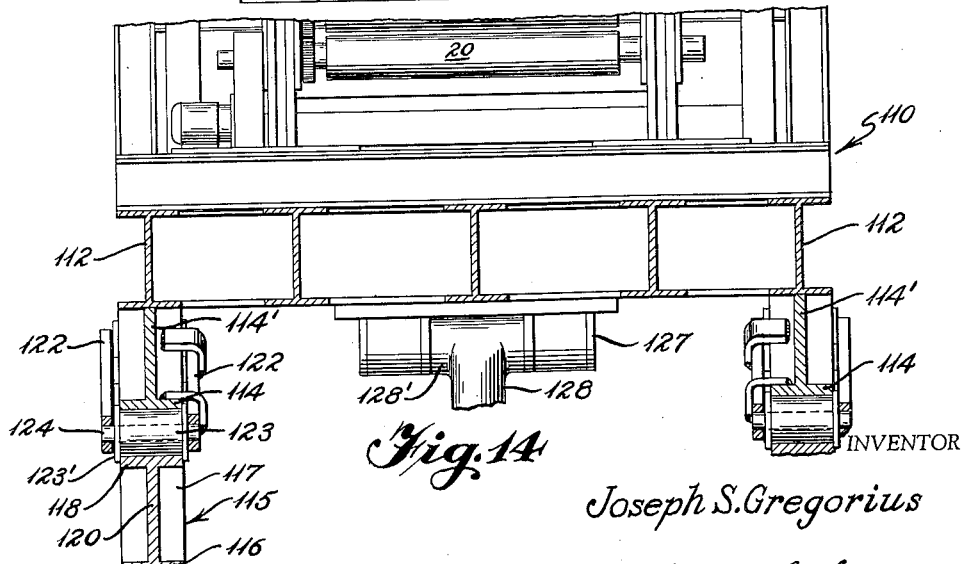
FIG. 14 is a sectional view along line 14—14 of FIG. 12 showing antifriction support rollers in the tiltable day tank mounting.

Reference is now had to FIGURES 12, 13 and 14 which show a modified mounting for tilting the day tank. The day tank or glass melting tank 110 is mounted on a tilting platform 111 in this construction and is similar to the type of day tank 10 illustrated and described heretofore as mounted on platform 23.

Platform 111 in this modified construction has the outer longitudinal I-beams 112 as best shown in FIG. 12 fabricated to extend forward at 13. Portion 113 is cut down in height and provided with a reinforcing top web 113' extending rearwardly to the upwardly and rearwardly extending web portion 113" which is welded to the top web 112' of side beam 112. An arcuate shoe 114 having a radius of curvature of about 10 ft. 8 inches from the center of lower roll 20 is welded to the front end of beam portion 113 which is cut on a corresponding arc and is adjacent the mid-length of the bottom web 112" of the I-beam 112. The arcuate shoe 114" is reinforced with a vertically disposed central stiffening web 114' weldedly attached at its upper edge to the web 112" of I-beam 112.

To complete the pivotal support of the front end of platform 111, there is provided at each side a base generally indicated at 115 comprising a welded together frame work of a horizontal base plate 116, vertical end plates 117, an arcuate support shoe 118 having a radius of curvature of about 12 ft. from the center of lower roll 20, and top end plates 119 joining the ends of shoe 118 with the ends 117 and a centrally disposed vertically extending stiffener plate 120.

Supporting the arcuate shoe 114 for pivotal movement about the center of lower roll 20 and on the support shoe 118 of base 115 is a set of rollers in a unit indicated generally at 121. Roller unit 121 comprises two arcuate side plates 122 secured to shoe 114 and extending in parallel vertical planes and having positioned therebetween and supported thereby spaced rollers 123. Rollers 123 are mounted on horizontal axis pins 124 secured in the side plates 122. The support surface of the rollers has about an 18 inch diameter and the rollers have projecting side flanges 123' extending radially outward at the ends of the supporting surface so as to abut the edges of the arcuate shoes 114 and 118 thereby holding the roller unit 121 in supporting position on shoe 118.

The rear end of the tiltable day tank shown in FIGURE 12 is provided with elevating mechanism generally indicated at 125. Fixed vertically extending support columns 126 having top horizontally disposed pads 126' are positioned at each rear corner of the platform 111 and under the side I-beams 112 to support the tank in its lowered position.

The elevating mechanism 125 may be of the hydraulic type. A pad eye 127 is secured to the bottom of platform 111 intermediate the sides at the rear end. A piston 128 having a cross head 128' is received in between the bifurcated lugs 127' of the pad eye 127 and pivotally secured thereto by a pivot pin 129. Piston 128 is received in a power cylinder 130 having a head 130' and a bottom 131. Bottom 131 has a transverse aperture 131' therethrough and is received in a pad eye 132 and secured for pivotal movement therein by a pin 132' positioned in the bottom of a sump 133. Power cylinder 130 is provided with hydraulic conduits and controls (not shown).

In FIG. 12 the position of the tilted day tank 110 and its platform 111 is shown in broken lines. It will be noted that it pivots about the axis of the lower roll 20. The supporting roller unit 121 moves with shoe 114 relative to shoe 118 during the tilting upward and lowering of the tank.

In operation of either tank 10 or 110 the tank is fired and ports 81 are used for firing while ports 82 are used as exit ports. The exhaust gases heat the refractory checker work in the ducts and then the firing is reversed. The heated checker work serves to heat the air being introduced to the then burners used and later the sequence is reversed.

These tiltable day tanks or melting tanks have a capacity of 30 tons. Through their arrangement of firing and continued fired in an elevated position they fulfill a great need and are very flexible in operation.

A cycle of operation may include charging with an initial fill through filling aperture 51 followed by firing. A second fill is made followed by a second firing. At peak temperature, planning or firing takes place followed by reduction of temperature. At a reduced temperature condition, the tanks are tilted gradually through their power tilting units. The glass is poured over the lipstone 47 and between the feed rolls 20 and 21.

These tiltable day tanks or glass melting tanks can be used to pour into draw kilns or pots and sheets can be drawn therefrom or they can be used as here disclosed.

I claim as my invention:

1. Apparatus for forming glass comprising in combination, a glass melting tank having a charging aperture in one side and a horizontally disposed discharge port at the opposite end, a pair of forming rolls lying adjacent said discharge port and between which said glass is flowed from the tank, the lower of said rolls lying on an axis about which the tank is tiltable for teeming and pouring, a base having an upwardly facing arcuate bearing sector therein having its center of curvature in alignment with the central axis of the lower of said rolls, a plurality of rollers mounted on said arcuate bearing sector of the base, an arcuate bearing sector of like curvature to the first said sector and attached to said tank at the bottom thereof and having its center of curvature lying in the axis of said lower roll, said tank and its arcuate sector being supported for pivotal movement by said rollers in the first arcaute sector, means attached to said glass melting tank for tilting the same for teeming and pouring, a firing and regenerator port in one side of said tank, an auxiliary firing port thereadjacent and an exit and regenerator port in the tank for exhaust and regenerator gases, a fixed burner adjacent said firing and regenerator port and in alignment therewith for movement of the firing port past the fixed burner, a burner in said auxiliary firing port and movable therewith while said tank is tilted, a flexible fuel supply line connectable with said auxiliary burner during teeming and pouring thereby permitting firing of said tank and a regenerator firing system having conduits therein in juxtaposition to said firing and regenerator port and said exit and regenerator port whereby the tank may be tilted past said conduits and back into alignment therewith.

2. Apparatus for forming glass comprising in combination, a glass melting tank having a charging aperture in one end and a horizontally disposed discharge port at the opposite end, pivot means integrally attached to and supporting said tank for pivotal movement of said tank about an axis for teeming and pouring, a firing and regenerator port in one side of said tank, an auxiliary firing port thereadjacent and an exit and regenerator port in the tank for exhaust gases, means attached to said glass melting tank for tilting the same from a horizontal position about said axis for teeming and pouring, a fixed burner adjacent said firing port and in alignment therewith only when the tank is supported at said horizontal position by said pivot means, a burner in said auxiliary firing port and movable therewith while said tank is tilted about said axis, a flexible fuel supply line connectable with said auxiliary burner during teeming and pouring thereby permitting firing of said tank and a regenerating firing system having conduits therein in juxtaposition to said firing and regenerator port and said exit and regenerator port whereby the tank may be tilted past said conduits and back into alignment therewith.

3. Self contained apparatus for forming glass comprising in combination, a glass melting tank structure assembly having a charging aperture in one end and a horizontally disposed discharge port at the opposite end, pivot means adjacent said discharge port supporting said tank about a horizontal pivot axis extending through said pivot support means for teeming and pouring, means attached to said glass melting tank for tilting the same for teeming and pouring, support means for forming rolls attached to said tank adjacent said discharge port, a lower forming roll mounted on said roll support means and having its axis coinciding with said horizontal pivot axis of said tank whereby pouring of melted glass may take place from said discharge port and over said lower forming roll, an upper forming roll adjustably mounted above said lower roll in said support means for the forming rolls whereby a ribbon of glass may be formed during pouring from said melting tank, a firing and regenerator port in the melting tank, an auxiliary firing port there adjacent and an exit and regenerator port in the melting tank for exhaust gases, a fixed burner adjacent said firing port and in alignment only therewith when said melting tank is in an untilted position, said firing and regenerator port and the tank being movable past said fixed burner, a burner in said auxiliary firing port and movable therewith as said melting tank is tilted for teeming or pouring, a flexible fuel supply line connected with said auxiliary burner thereby permitting firing of said melting tank during teeming and pouring in said self contained apparatus for forming glass and a regenerating firing system having conduits therein in juxtaposition to said firing and regenerator port and the exit and regenerator port in the melting tank whereby the melting tank may be tilted past said conduits and back into alignment therewith.

References Cited in the file of this patent

UNITED STATES PATENTS

| | | |
|---|---|---|
| 1,413,766 | Myers | Apr. 25, 1922 |
| 1,564,230 | Gelstharp | Dec. 8, 1925 |
| 1,749,332 | Franzen | Mar. 4, 1930 |
| 2,036,902 | Warlimont | Apr. 7, 1936 |
| 2,257,229 | Drake | Sept. 30, 1941 |
| 2,326,044 | Littleton | Aug. 3, 1943 |
| 2,451,086 | Hicks et al. | Oct. 12, 1948 |
| 2,481,699 | Stroman | Sept. 13, 1949 |
| 2,642,486 | English | June 30, 1953 |
| 2,662,761 | Chesters | Dec. 15, 1953 |
| 2,742,275 | Allen | Apr. 17, 1956 |
| 2,772,517 | Bowes | Dec. 4, 1956 |

FOREIGN PATENTS

| | | |
|---|---|---|
| 735,260 | France | Nov. 5, 1932 |

UNITED STATES PATENT OFFICE

CERTIFICATE OF CORRECTION

Patent No. 3,037,323

June 5, 1962

Joseph S. Gregorius

It is hereby certified that error appears in the above numbered patent requiring correction and that the said Letters Patent should read as corrected below.

Column 2, line 40, for "glas" read -- glass --; column 4, line 62, for "opening" read -- openings --; column 5, line 28, for "13" read -- 113 --; line 37, for "114″" read -- 114 --; column 6, line 53, for "arcaute" read -- arcuate --; column 8, line 28, list of reference cited, for "2,642,486" read -- 2,643,486 --.

Signed and sealed this 27th day of November 1962.

(SEAL)
Attest:
ESTON G. JOHNSON
Attesting Officer

DAVID L. LADD
Commissioner of Patents